(12) United States Patent
Bringuier et al.

(10) Patent No.: US 7,787,727 B2
(45) Date of Patent: Aug. 31, 2010

(54) DRY FIBER OPTIC CABLES AND ASSEMBLIES

(75) Inventors: Anne G. Bringuier, Taylorsville, NC (US); Jody L. Greenwood, Hickory, NC (US); David Alan Seddon, Hickory, NC (US); Kenneth D. Temple, Jr., Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/553,426

(22) Filed: Sep. 3, 2009

(65) Prior Publication Data

US 2009/0324183 A1    Dec. 31, 2009

Related U.S. Application Data

(60) Continuation of application No. 12/277,963, filed on Nov. 25, 2008, now abandoned, which is a division of application No. 11/643,357, filed on Dec. 21, 2006, now Pat. No. 7,471,862, which is a continuation-in-part of application No. 11/193,516, filed on Jul. 29, 2005, now Pat. No. 7,415,181.

(51) Int. Cl.
*G02B 6/44* (2006.01)
(52) U.S. Cl. .................. 385/113; 385/100; 385/103; 385/114
(58) Field of Classification Search .................. 385/113
See application file for complete search history.

(56) References Cited

U.S. PATENT DOCUMENTS

| | | | |
|---|---|---|---|
| 4,078,853 A | 3/1978 | Kempf et al. | 350/96.23 |
| 4,089,585 A | 5/1978 | Slaughter et al. | 350/96.23 |
| 4,199,225 A | 4/1980 | Slaughter et al. | 350/96.23 |
| 4,401,361 A | 8/1983 | Slaughter | 350/96.23 |
| 4,420,220 A | 12/1983 | Dean et al. | 350/96.23 |

(Continued)

FOREIGN PATENT DOCUMENTS

DE    2434280    7/1974

(Continued)

OTHER PUBLICATIONS

Patent Cooperation Treaty, International Search Report for PCT/US2007/025953, Mar. 14, 2008, 3 pages.

(Continued)

*Primary Examiner*—Charlie Peng
*Assistant Examiner*—Mary A El Shammaa
(74) *Attorney, Agent, or Firm*—C. Keith Montgomery

(57) ABSTRACT

A fiber optic cable includes at least one optical fiber, at least one strength member, at least one dry insert, and a cable jacket. The cable jacket has a cavity with a generally rectangular cross-section with the at least one optical fiber and the at least one dry insert disposed therein. The at least one optical fiber has a predetermined level of coupling to the cable jacket that is provided by the at least one dry insert within the cavity of cable jacket. The predetermined level of coupling is about 0.1625 Newtons or more per optical fiber for a thirty meter length of fiber optic cable. Additionally, fiber optic cables of the present invention are also suitable as a portion of a cable assembly.

22 Claims, 11 Drawing Sheets

U.S. PATENT DOCUMENTS

| | | | | |
|---|---|---|---|---|
| 4,446,686 A | 5/1984 | Panuska et al. | ............... | 57/6 |
| 4,705,571 A | 11/1987 | Lange et al. | ............... | 106/287 |
| 4,707,569 A | 11/1987 | Yoshimura et al. | ............ | 174/116 |
| 4,725,628 A | 2/1988 | Garvey et al. | ............... | 521/137 |
| 4,725,629 A | 2/1988 | Garvey et al. | ............... | 521/137 |
| 4,761,053 A | 8/1988 | Cogelia et al. | ............ | 350/96.23 |
| 4,815,813 A | 3/1989 | Arroyo et al. | ............ | 350/96.23 |
| 4,818,060 A | 4/1989 | Arroyo | ................... | 350/96.23 |
| 4,909,592 A | 3/1990 | Arroyo et al. | ............ | 350/96.23 |
| 4,913,517 A | 4/1990 | Arroyo et al. | ............ | 350/96.23 |
| 4,979,795 A | 12/1990 | Mascarenhas | ............ | 350/96.23 |
| 5,016,952 A | 5/1991 | Arroyo et al. | ............... | 350/96.2 |
| 5,054,880 A | 10/1991 | Bruggendieck | ............ | 385/111 |
| 5,109,456 A | 4/1992 | Sano et al. | ............... | 385/100 |
| 5,109,457 A | 4/1992 | Panuska et al. | ............ | 385/102 |
| 5,125,060 A | 6/1992 | Edmundson | ............... | 385/100 |
| 5,125,063 A | 6/1992 | Panuska et al. | ............ | 385/113 |
| 5,133,034 A | 7/1992 | Arroyo et al. | ............... | 385/107 |
| 5,218,659 A | 6/1993 | Schneider | ................... | 385/110 |
| 5,224,190 A | 6/1993 | Chu et al. | ................... | 385/107 |
| 5,243,675 A | 9/1993 | Kathiresan et al. | ......... | 385/109 |
| 5,377,290 A | 12/1994 | Ohta et al. | ................... | 385/100 |
| 5,422,973 A | 6/1995 | Ferguson et al. | ............ | 385/112 |
| 5,509,097 A | 4/1996 | Tondi-Resta et al. | ....... | 385/113 |
| 5,621,841 A | 4/1997 | Field | ........................... | 385/113 |
| 5,621,842 A | 4/1997 | Keller | ........................ | 385/114 |
| 5,630,003 A | 5/1997 | Arroyo | ....................... | 385/113 |
| 5,651,081 A | 7/1997 | Blew et al. | ................. | 385/101 |
| 5,668,912 A | 9/1997 | Keller | ........................ | 385/100 |
| 5,673,352 A | 9/1997 | Bauer et al. | ................ | 385/114 |
| 5,675,686 A | 10/1997 | Rosenmayer et al. | ....... | 385/114 |
| 5,684,904 A | 11/1997 | Bringuier et al. | ........... | 385/109 |
| 5,689,601 A | 11/1997 | Hager et al. | ................ | 385/100 |
| 5,698,615 A | 12/1997 | Polle | .......................... | 523/173 |
| 5,763,067 A | 6/1998 | Bruggenmann et al. | .. | 428/317.9 |
| 5,838,863 A | 11/1998 | Fujiura et al. | .............. | 385/103 |
| 6,087,000 A | 7/2000 | Girgis et al. | ............... | 428/392 |
| 6,091,871 A | 7/2000 | Elisson et al. | .............. | 385/113 |
| 6,122,424 A | 9/2000 | Bringuier | ................... | 385/100 |
| 6,178,278 B1 | 1/2001 | Keller et al. | ............... | 385/109 |
| 6,226,431 B1 | 5/2001 | Brown et al. | ............... | 385/114 |
| 6,229,944 B1 | 5/2001 | Yokokawa et al. | ......... | 385/114 |
| 6,256,439 B1 | 7/2001 | Brown et al. | ............... | 385/114 |
| 6,278,826 B1 | 8/2001 | Sheu | ........................... | 385/109 |
| 6,314,224 B1 | 11/2001 | Stevens et al. | ............. | 385/113 |
| 6,321,012 B1 | 11/2001 | Shen | ........................... | 385/106 |
| 6,377,738 B1 | 4/2002 | Anderson et al. | ........... | 385/113 |
| 6,389,204 B1 | 5/2002 | Hurley | ....................... | 385/102 |
| 6,463,199 B1 | 10/2002 | Quinn et al. | ................ | 385/109 |
| 6,493,491 B1 | 12/2002 | Shen et al. | .................. | 385/113 |
| 6,504,979 B1 | 1/2003 | Norris et al. | ............... | 385/109 |
| 6,574,400 B1 | 6/2003 | Lail | ............................. | 385/109 |
| 6,579,014 B2 | 6/2003 | Melton et al. | ................ | 385/76 |
| 6,586,094 B1 | 7/2003 | Rebouillat et al. | .......... | 428/372 |
| 6,618,526 B2 | 9/2003 | Jackman et al. | ............ | 385/102 |
| 6,654,527 B2 | 11/2003 | Sakabe et al. | .............. | 385/114 |
| 6,711,329 B2 | 3/2004 | Zelesnik | .................... | 385/100 |
| 6,714,708 B2 | 3/2004 | McAlpine et al. | ........... | 385/110 |
| 6,728,451 B2 | 4/2004 | Kordahi | ..................... | 385/100 |
| 6,748,148 B2 | 6/2004 | Chiasson et al. | ............ | 385/114 |
| 6,749,446 B2 | 6/2004 | Nechitailo | .................. | 439/44 |
| 6,792,184 B2 | 9/2004 | Conrad et al. | ............... | 385/114 |
| 6,847,768 B2 | 1/2005 | Lail et al. | .................... | 385/111 |
| 6,853,783 B2 | 2/2005 | Chaisson et al. | ............ | 385/114 |
| 2002/0009272 A1 | 1/2002 | Parris | ........................ | 385/109 |
| 2003/0044137 A1 | 3/2003 | Lopez | ........................ | 385/113 |
| 2003/0068147 A1 | 4/2003 | Nechitailo | .................. | 385/114 |
| 2004/0120663 A1 | 6/2004 | Lail et al. | .................... | 385/100 |
| 2004/0156603 A1 | 8/2004 | Schneider et al. | ........... | 385/102 |
| 2005/0013573 A1 | 1/2005 | Lochkovic et al. | .......... | 385/128 |
| 2005/0053342 A1 | 3/2005 | Melton et al. | ............... | 385/113 |
| 2006/0140557 A1 | 6/2006 | Parris et al. | ................. | 385/113 |
| 2006/0165355 A1 | 7/2006 | Greenwood et al. | ......... | 385/100 |

FOREIGN PATENT DOCUMENTS

| | | |
|---|---|---|
| DE | 2445532 | 1/1976 |
| DE | 2743260 | 4/1979 |
| DE | 2944997 | 11/1979 |
| DE | 3444500 A1 | 11/1985 |
| DE | 19713063 A1 | 10/1998 |
| DE | 10129772 A1 | 1/2003 |
| EP | 0022036 A1 | 1/1981 |
| EP | 0577233 A1 | 1/1994 |
| EP | 0916980 A1 | 5/1999 |
| EP | 1087247 | 4/2000 |
| EP | 10655545 A1 | 1/2001 |
| EP | 1170614 A1 | 1/2002 |
| EP | 1245981 | 10/2002 |
| EP | 13202796 A1 | 4/2006 |
| GB | 2159591 A | 11/1985 |
| GB | 2189071 A | 10/1987 |
| JP | 58-150907 | 9/1983 |
| JP | 60-087307 | 5/1985 |
| JP | 61-023101 | 1/1986 |
| JP | 63-201611 | 8/1988 |
| JP | 7-159629 | 6/1995 |
| JP | 09-152535 | 11/1995 |
| JP | 11-271581 A | 10/1999 |
| JP | 11-337783 A | 12/1999 |
| JP | 2001-343565 A | 12/2001 |
| JP | 2001/343566 A | 12/2001 |
| JP | 2002-236241 | 8/2002 |
| WO | WO02/099491 A1 | 12/2002 |
| WO | WO2004/038474 A1 | 5/2004 |
| WO | WO2006/043967 A1 | 4/2006 |
| WO | WO2007/016479 A2 | 2/2007 |
| WO | WO2007/092046 A1 | 8/2007 |

OTHER PUBLICATIONS

Norris, R.H.; Wiemann, P.A., "Dry Central Tube Ribbon Cables for the Outside Plant Environment", Proc. of the 51st Intern. Wire & Cable Symposium, p. 202-210 (2002).

Van Vickle, P., et al., "Innovative Dry Buffer Tube Design for Central Tube Ribbon Cable", Proc. of the 2001 National Fiber Optics Engineers Conference, p. 154-161 (2001).

Taylor, C., et al., "Effect of Water Blocking Materials on Moisture Diffusion in Prototype Cable Structures", Proc. of the 50th Intern. Wire & Cable Symposium, p. 518-525 (2001).

Dixon, L., et al., "Crush and Bending Resistance in Next Generation Cable Designs", Proc. of the 50th Intern. Wire & Cable Symposium, p3 422-431 (2001).

Wagman, R., et al. "BOTDR Analysis of Cable Tensile Testing", Proc. of the 48th Intern. Wire & Cable Symposium, p. 658-664 (1999).

Beasley, B., Look Mom! No Gel! Outside Plant Magazine Dec. 2002. p. 16-18.

Geca-Tapes, Non-Woven Wrapping-Tapes Catalog—"Foam Tapes", Apr. 1996.

Geca-Tapes, Waterblocking Tapes Catalog—"Waterblocking Foam Tapes", Apr. 1996.

Dow Plastics, "Resin For Ripe Extrusion and Pipe Fittings", Apr. 7, 2003.

Okada, et al., proceedings of the 49th International Wire and Cable Symposium "Development of New Dry Tube with Water Blocking Laminated Tape", Nov. 2000.

Chung, Su-Vun, "Macrobend Loss of 1300nm Optimized Single Mode Fibre" at 1550nm, International Wire & Cable Symposium Proceedings 1988. pp. 704-709.

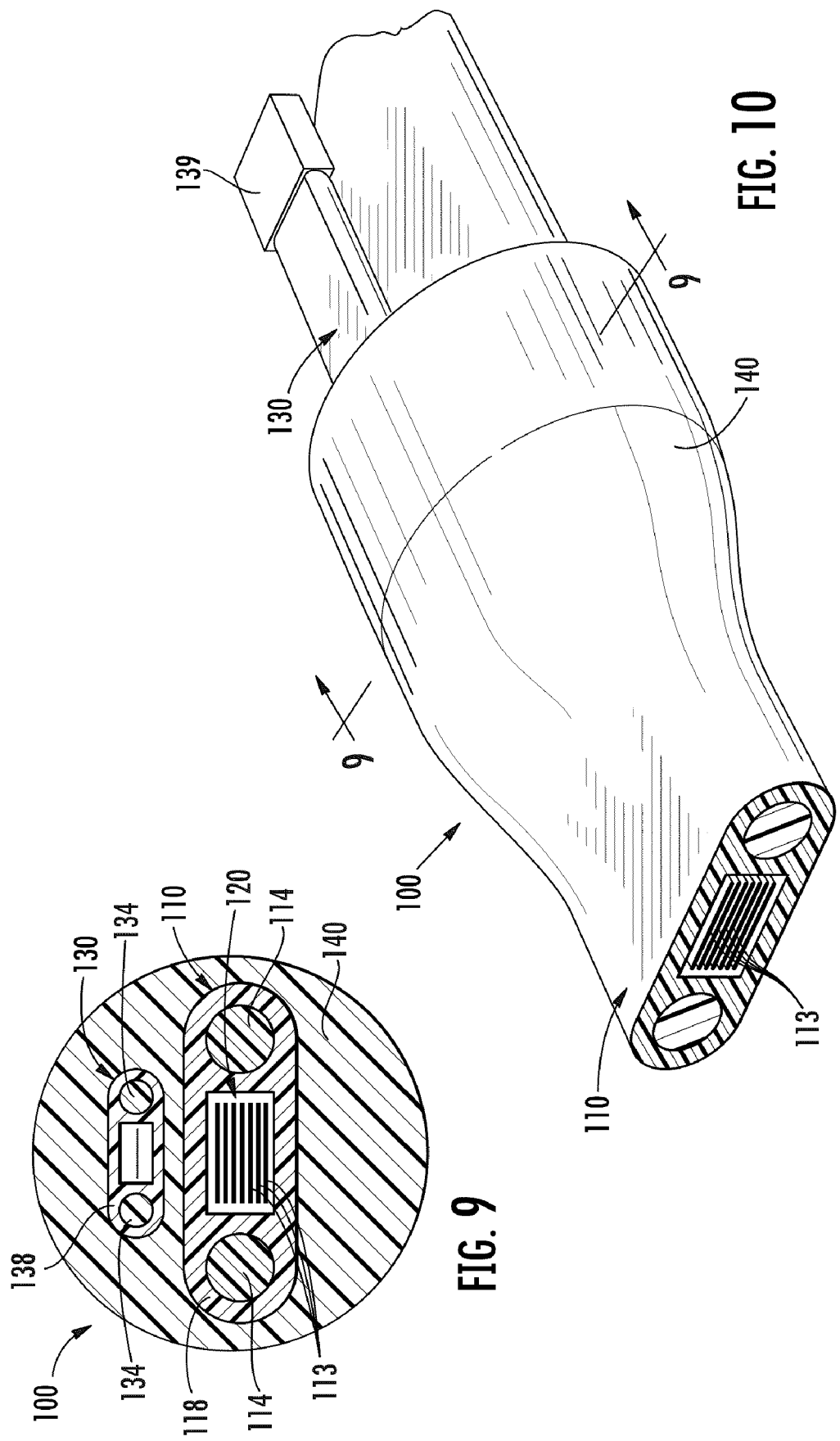

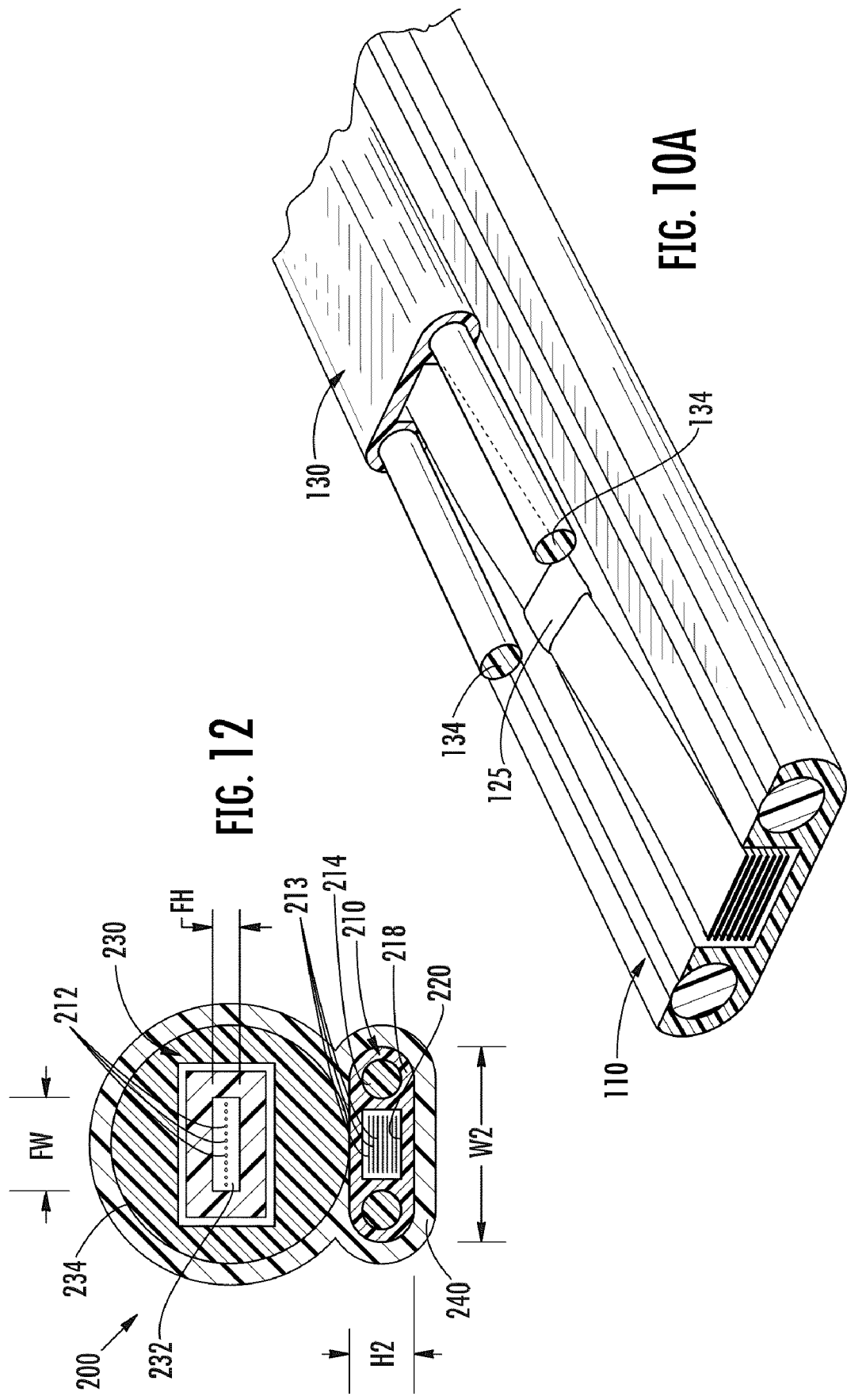

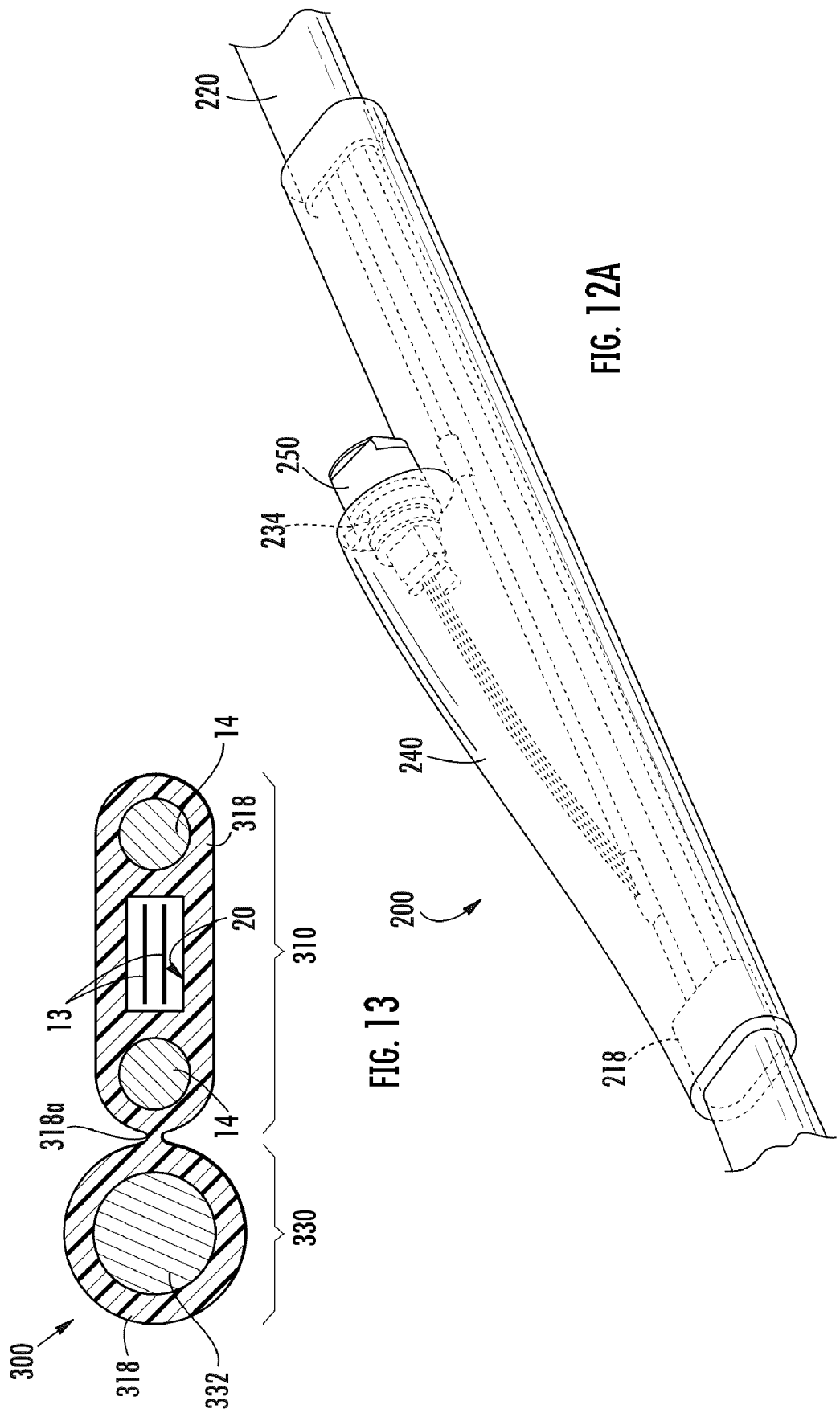

DRY FIBER OPTIC CABLES AND ASSEMBLIES

RELATED APPLICATIONS

This application is a Continuation of U.S. Ser. No. 12/277,963 filed on Nov. 25, 2008 now abandoned, which is a Divisional of U.S. Ser. No. 11/643,357 filed on Dec. 21, 2006, now U.S. Pat. No. 7,471,862, which is a Continuation-In-Part (CIP) of U.S. Ser. No. 11/193,516 filed on Jul. 29, 2005, now U.S. Pat. No. 7,415,181, all of which are incorporated herein by reference.

TECHNICAL FIELD

The present invention relates generally to dry fiber optic cables and assemblies that are useful for routing optical fibers such as toward the subscriber. Specifically, the fiber optic cables and assemblies of the present invention are useful as feeder cables, distribution cables, drop cables, and/or other suitable cables/assemblies in an optical network.

BACKGROUND

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data with a reasonable cable diameter. Consequently, optical waveguide cables replaced most of the copper cables in long-haul communication network links, thereby providing greater bandwidth capacity for long-haul links. However, most communication networks still use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the optical fiber long-haul links.

As optical waveguides are deployed deeper into communication networks, subscribers will have access to increased bandwidth. But certain obstacles exist that make it challenging and/or expensive to route optical waveguides/optical cables closer to the subscriber. For instance, accessing optical waveguides and the connection between a drop cable and the distribution fiber optic cable require a low-cost solution that is craft-friendly for installation, connectorization, and versatility. Moreover, the reliability and robustness of the fiber optic cables and the interconnection therebetween must withstand the rigors of an outdoor environment.

Conventional distribution fiber optic cables require opening by cutting or otherwise splitting the cable jacket and pulling the optical fibers through the jacket opening. However, it can be difficult to locate the correct fibers, and even when they are located, removing them from the cable without damaging the selected optical fibers or other optical fibers in the cable can be challenging. Once the desired optical fibers are located and safely removed, the operator has to connectorize or splice the optical fibers for optical connection with the network. Conducting the access process with conventional cables in less-than-ideal conditions in the field is time-consuming, expensive, and risks damaging the optical fibers of conventional cables. Likewise, the access process is difficult in the factory with conventional cables.

SUMMARY

To achieve these and other advantages and in accordance with the purpose of the invention as embodied and broadly described herein, the invention is directed in one aspect to a dry fiber optic cable that includes at least one optical fiber, at least one strength member, at least one dry insert, and a cable jacket. The cable jacket has a cavity with a generally rectangular cross-section with the at least one optical fiber and the at least one dry insert disposed therein. The at least one optical fiber has a predetermined level of coupling to the cable jacket that is provided by the at least one dry insert within the cavity of cable jacket. The predetermined level of coupling is about 0.1625 Newtons or more per optical fiber for a thirty meter length of fiber optic cable.

In another aspect the invention is directed to a dry fiber optic cable including at least one optical fiber ribbon, a first dry insert, a second dry insert, at least two strength members and a cable jacket. The cable jacket includes a cavity with the at least one optical fiber ribbon, the first dry insert, and the second dry insert disposed therein. The two strength members are disposed on opposite sides of the cavity for providing tensile strength for the fiber optic cable. The first dry insert and the second dry insert provide a predetermined level of coupling of the at least one optical fiber ribbon to the cable jacket, wherein the predetermined level of coupling is about 0.1625 Newtons or more per optical fiber for a thirty meter length of fiber optic cable.

In another aspect the invention is directed to a fiber optic cable assembly including a dry distribution cable and a tether optical fiber cable. The dry distribution cable includes at least one optical fiber, at least one strength member, and a cable jacket. The cable jacket has a cavity and the at least one optical fiber is disposed within the cavity. The at least one optical fiber having a predetermined level of coupling to the cable jacket, wherein the predetermined level of coupling is about 0.1625 Newtons or more per optical fiber for a thirty meter length of the distribution cable. The tether optical fiber cable has at least one tether optical fiber with the tether optical fiber being in optical communication with the at least one optical fiber of the distribution cable.

It is to be understood that both the foregoing general description and the following detailed description present exemplary and explanatory embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various exemplary embodiments of the invention, and together with the description, serve to explain the principles and operations of the invention.

BRIEF DESCRIPTION OF THE DRAWINGS

FIGS. 9 and 10 respectively are a cross-sectional view and a perspective view of an explanatory fiber optic cable assembly according to the present invention.

FIG. 10a depicts a perspective view of a portion the cable FIGS. 9 and 10 after being opened and before the sealing portion is applied.

FIGS. 12 and 12a respectively are a cross-sectional view and a perspective view of another fiber optic cable assembly according to the present invention.

FIG. 13 is a cross-sectional view of yet another fiber optic cable according to the present invention.

DETAILED DESCRIPTION OF EXEMPLARY EMBODIMENTS

Figure 1:
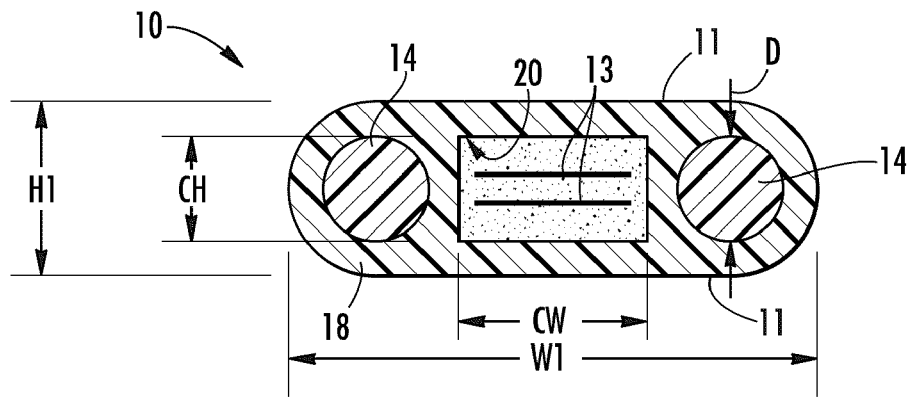
FIG. 1 is a cross-sectional view of an explanatory embodiment of a fiber optic cable according to the present invention.
Figure 1A:
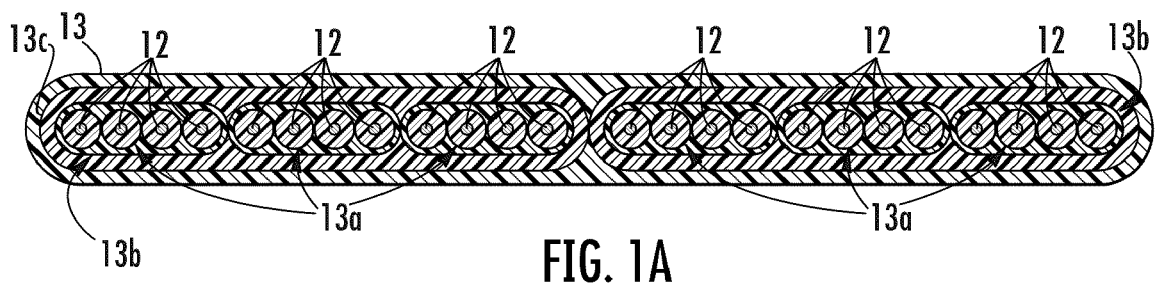
FIGS. 1a-1c depict cross-sectional views of exemplary optical fiber ribbons suitable for use in the cables of the present invention.
Figure 1B:
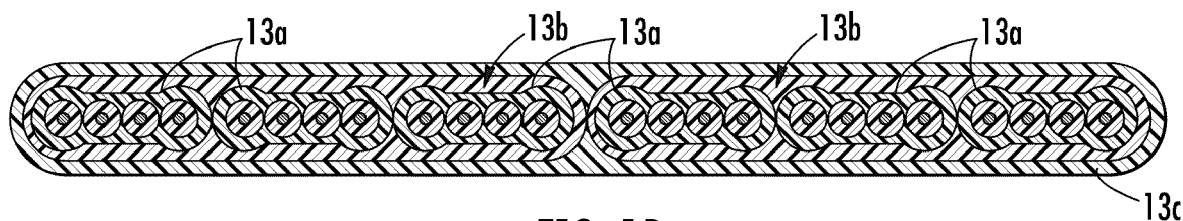
Figure 1C:
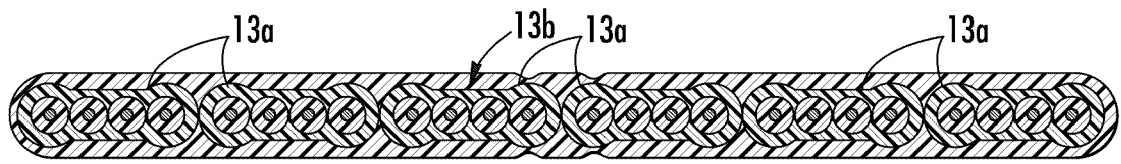

Reference will now be made in detail to exemplary embodiments of the invention, examples of which are described herein and shown in the accompanying drawings. Whenever practical, the same reference numerals are used throughout the drawings to refer to the same or similar parts or features. FIG. 1 depicts an exemplary fiber optic cable 10 (hereinafter cable 10) according to the present invention that can be configured for use as a drop cable, a distribution cable, or other suitable portions of an optical network. Generally speaking, a distribution cable will have a relatively high optical fiber count such twelve or more optical fibers for further distribution to the optical network. On the other hand, a drop cable will have a relatively low optical count such as up to four optical fibers for routing towards a subscriber or a business, but drop cables may include higher fiber counts. Cable 10 generally includes at least one optical fiber 12 disposed as a portion of an optical fiber ribbon 13, at least one strength member 14, and a cable jacket 18 having a cavity 20 configured with a generally flat profile. In other words, cables of the present invention have two major surfaces 11 that are generally flat and are connected by arcuate end surfaces (not numbered) as shown, thereby resulting in a cable having a relatively small cross-sectional footprint. As best shown in FIGS. 1a-1c, at least one optical fiber 12 is arrayed with a plurality of other optical fibers as a portion of optical fiber ribbon 13. Cable 10 also includes two strength members 14 disposed on opposing sides of cavity 20, thereby imparting a preferential bend characteristic to cable 10. Strength members 14 are preferably a dielectric material such as glass-reinforced plastic, thereby allowing an all dielectric cable design; however, strength members may be a conductive material such as steel or the like. Cavity 20 is sized for allowing ribbons 13 the adequate freedom to move when, for instance, the cable is bent while maintaining adequate optical attenuation performance of the optical fibers within the cable. Simply stated, the cavity is not tightly drawn onto the optical fiber, but allows some movement. Additionally, jacket 18 may be formed from a flame-retardant material, thereby making it suitable for indoor applications such as multi-dwelling units (MDUs).

Cable 10 is advantageous because it can be easily accessed from either of the generally planar sides of the cable, thereby allowing access to the desired optical fiber. In other words, ribbons from either side of the ribbon stack, i.e., top or bottom, can be accessed by opening the cable at the respective planar side. Consequently, the craftsman is able to access to any optical fiber desired for optical connection. As depicted, cavity 20 has a cavity minor dimension CH and a cavity major dimension CW and has a generally rectangular shape with a fixed orientation, but other shapes and arrangements are possible such as generally square, round, or oval. By way of example, cavity may be rotated or stranded in any suitable manner along its longitudinal length. The cavity can also have a partial oscillation through a given angle, for instance, the cavity can rotate between a clockwise angle that is less than a full rotation and then rotate counter-clockwise for less than a full rotation. Furthermore, one or more cavities may be offset towards one of the major surfaces 11, thereby allowing easy opening and access from one side as shown in FIG. 7a.

As shown in FIG. 1, cavity minor dimension CH is generally aligned with a minor dimension H1 of distribution cable 10 and cavity major dimension CW is generally aligned with the major dimension W1 of cable 10. As depicted, strength members 14 are disposed on opposite sides of cavity 20 and are sized so that a strength member dimension D generally aligned with minor dimension H1 of the cable is about the same size or smaller than the cavity minor dimension CH. By way of example, cavity minor dimension CH is sized so it is about five percent larger or more than a strength member dimension D that is generally aligned with minor dimension H1 of the cable. Illustratively, strength member 14 is a round glass-reinforced plastic (grp) having a diameter of about 2.3 millimeters and cavity minor dimension CH is about 2.5 millimeters. Of course, strength members 14 can have shapes other than round such as the oval strength members shown in FIG. 2.

Consequently, the craftsman or automation process has simple and easy access to cavity 20 by running a utility blade or cutting tool along the length of the cable without cutting into strength members 14, thereby allowing entry to cavity 20 while inhibiting damage to the at least one optical fiber 12 or strength members during the access procedure. In other words, the craftsman can simply cut into cable jacket 18 by slicing the cable jacket 18 and may use strength members 14 as a guide for the blade or cutting tool, thereby exposing cavity 20 during the cutting and allowing access to the at least one optical fiber therein. In other words, sizing the cavity minor dimension CH so that it is about the same size or greater than the strength member dimension D that is generally aligned with minor dimension H1 advantageously allows quick and reliable access to cavity 20. Thus, the optical fibers in the cables of the present invention may be easily, quickly, and repeatably accessed by a craftsman or likewise in an automated process. However, cable or cable assembly embodiments according to the present invention can have cavities with minor cavity dimensions generally aligned with the minor cable dimension that are smaller than the strength member dimension D. Additionally, the generally flat major surfaces of the cables are advantageous because they allow for a smaller cable footprint and uses less jacket material compared with round cables.

Figure 5:
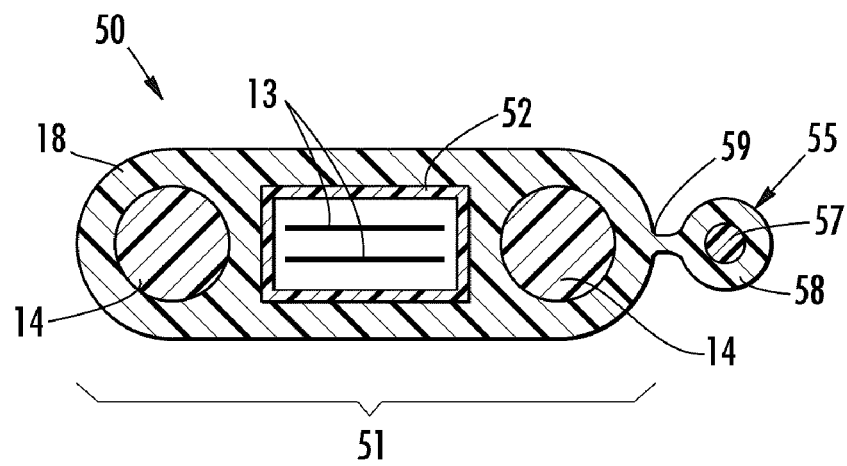
FIG. 5 is a cross-sectional view of another explanatory fiber optic cable according to the present invention.

Cables according to the present invention may have any suitable dimensions, constructions, and/or fiber counts for the given application. By way of example, in distribution applications the major dimension W1 is preferably about 15 millimeters or less and the minor dimension H1 is preferably about 10 millimeters or less. In drop applications, major dimension W1 is preferably about 10 millimeters or less and the minor dimension H1 is preferably about 5 millimeters or less. Of course, other cables of the present invention can have other sizes and/or structures for the given application depending on the requirements and fiber count of the cable. For instance, cables of the present invention may have larger dimensions for the major dimension, the minor dimension, and/or different structures such as a toneable portion as shown in FIG. 5 for locating the cable in buried applications. FIG. 13 depicts a cable 300 suitable for aerial applications that is similar to cable 10 but it further includes a messenger section 330 having a messenger strength member 332. Messenger strength member 332 is connected with a main cable body 310 by a web 318a of cable jacket 318. Messenger strength member 332 may be formed form any suitable material such as a dielectric or conductor and/or have any suitable construction such as solid rod or stranded. Additionally, cable designs can have any suitable fiber count and/or optical fiber arrangement depending on the application in the optical network. Some suitable optical fiber arrangements include ribbons with or without subunits, ruggedized ribbons having a tight-buffer layer, tight-buffered or colored optical fibers, loose optical fibers in a tube, optical fibers in a module, or optical fibers disposed in a bundle.

Optical fiber ribbons 13 used in the cables of the present invention can have any suitable design or ribbon count. FIGS. 1a-1c depict exemplary optical fiber ribbons 13 that use a plurality of subunits each having four optical fibers; however, ribbons without subunits are possible and subunits may have different fiber counts. Subunits allow predetermined splitting of the optical fiber ribbons into predictable smaller fiber count units, preferably without the use of special tools. Specifically, each of the depicted ribbons includes six subunits for a total of twenty-four optical fibers 12, thereby making the illustrated ribbon configurations advantageous for a distribution cable. FIG. 1a depicts a twenty-four fiber ribbon 13 with two twelve-fiber units (not numbered) each having three subunits 13a connected by secondary matrix 13b and the twelve-fiber units are connected together by a common matrix 13c. FIG. 1b depicts another similar twenty-four fiber ribbon 13, except subunits 13a have end portions with a bulbous shape that is at least partially disposed over the outboard optical fibers of subunits 13a as disclosed in U.S. Pat. Nos. 6,748,148 and 6,792,184. FIG. 1c depicts a twenty-four fiber ribbon that merely uses subunits 13a and secondary matrix 13b for connecting the subunits together, but secondary matrix further includes preferential tear portions (not numbered) for separating the ribbon into two twelve-fiber units. Of course, other suitable ribbon configurations are possible such as two twelve fiber units, three eight fiber units, or six four fiber units depending on the requirements of the network architecture.

Optical fibers preferably have an excess fiber length (EFL) compared with a length of cavity 20. For instance, optical fibers have an EFL of between about 0.0 and about 0.5 percent; however, in some instances the EFL may also be slightly negative. Likewise, ribbons can have an excess ribbon length (ERL). Besides inhibiting the application of strain to the optical fibers, EFL or ERL can aid in coupling the optical fibers or ribbons with the cable jacket or tube. By way of example, the ERL is preferably in the range of about 0.1 percent to about 1.2 percent, and more preferably in the range of about 0.3 percent to about 1.0 percent, and most preferably in the range of about 0.5 percent to about 0.8 percent, thereby inhibiting the application of strain, allowing bending of the fiber optic cable without causing elevated levels of optical attenuation, and/or suitable low temperature performance. Additionally, the amount of ERL may depend on specific cable design such as the number of ribbons within the cavity, the cavity size, intended application, and/or other parameters.

Figure 2:
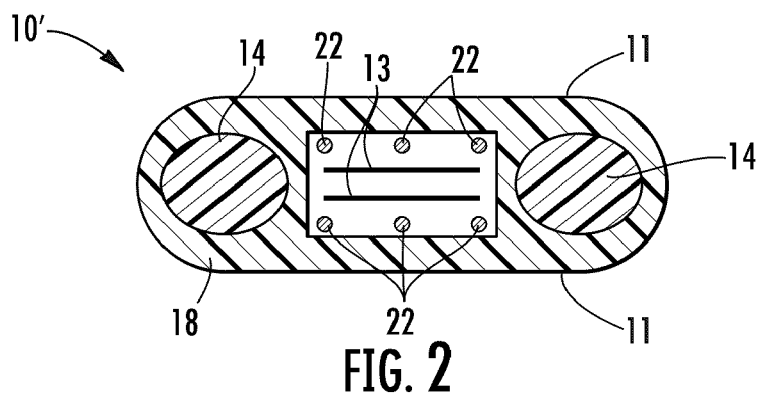
FIG. 2 is a cross-sectional view of another explanatory fiber optic cable according to the present invention.

As shown in FIG. 1, cavity 20 may be filled with a thixotropic grease or gel (not numbered) to inhibit the migration of water along the same. However, other suitable structures for inhibiting the migration of water along the cable are possible. As shown in FIG. 2, cable 10' is similar to cable 10 but further includes at least one water-swellable yarn 22 or thread disposed longitudinally within cavity 20 for blocking the migration of water. Water blocking structures may also be intermittent along the cable. For instance, the grease or gel may be disposed intermittently within the cavity or tube. Likewise, intermittent plugs of silicone, foam, or other suitable materials may be used to block the migration of water along the cable.

Figure 3:
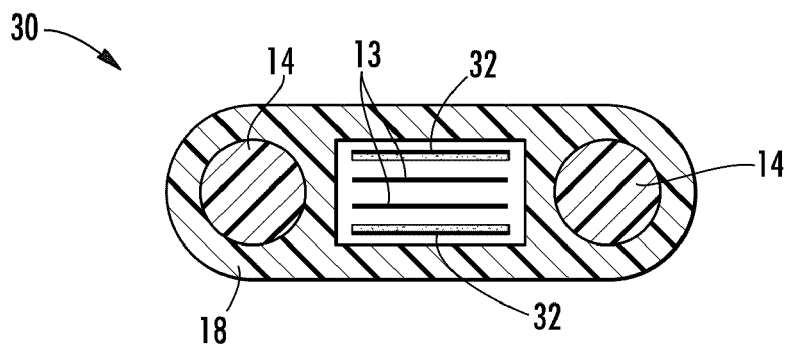
FIG. 3 is a cross-sectional view of still another explanatory fiber optic cable according to the present invention.

FIG. 3 depicts a cable 30 that is similar to cable 10 but further includes a plurality of dry inserts 32 (e.g., elongate tapes) such as foam tapes disposed within the cavity 20 for coupling the ribbons with jacket 18, but dry inserts 32 can also serve for blocking the migration of water along the cable. As depicted, dry inserts 32 are disposed on both the top and bottom of the ribbon stack. In other words, the components form a elongate tape/ribbon sandwich with the first elongate tape disposed on a first planar side of the ribbon (or ribbon stack) and the second elongate tape being disposed on a the second major side of the ribbon (or ribbon stack) within the generally rectangular cavity. Stated another way, planar surface(s) of the ribbon generally faces the planar surface of the dry inserts and the planar surface of the same is also generally aligned with the major dimension of the cavity so that all of the major planar surfaces of the components are generally aligned within the generally rectangular cavity as depicted in FIG. 3. Of course, other embodiments may have one or more dry inserts wrapped about the optical fibers or disposed on one or more sides thereof Specifically, cable 30 has two dry inserts 32 formed from an open cell polyurethane material; however, other suitable materials for coupling and cushioning of the ribbons are possible. In one embodiment, one or more dry inserts 32 include a water-swellable layer (represented by the solid hatching of the dry insert) for inhibiting the migration of water within the cable. For instance, a foam layer and a water-swellable layer are laminated together, thereby forming the water-swellable foam tape. In other embodiments, the compressible layer and the water-swellable layer are discrete individual components that are unattached. Generally speaking, water-swellable yarns and/or dry inserts are multi-functional. For instance, besides aiding the coupling the optical fibers, ribbons, or modules to the cable jacket, they may inhibit the migration of water, as well as cushion the optical fibers during bending of the cable. Additionally, dry inserts can be formed from other suitable materials and/or constructions besides an elongate foam tape for coupling, cushioning and/or allowing movement of the optical fibers . Moreover, like the other dry inserts the water-swellable layer is optional and can use any suitable material(s)/construction(s).

Figure 3A:
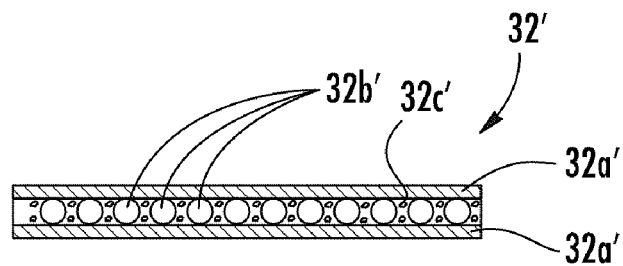
FIGS. 3a-3d are cross-sectional views of alternate dry inserts for use within the cavity of the fiber optic cables according to the present invention.

Illustratively, FIG. 3a depicts one example of another dry insert 32'. Dry insert 32' includes a compressible layer formed from a plurality of microspheres 32b' disposed between a top tape 32a' and bottom tape 32a'. As with other tapes of the dry insert, tapes 32a' can be formed from any suitable material such as a non-woven material, a polyester film like Mylar, or other like materials. More specifically, microspheres 32b' are generally disposed between tapes 32a' and are attached using a suitable method such as an adhesive, binding agent, application of heat and/or pressure, or the like. Additionally, an optional water-swellable substance such as a plurality of water-swellable particles, a plurality of water-swellable fiber, or a water-swellable coating 32c' may also be disposed between tapes 32a' with microspheres 32b' or on a portion one or more tapes 32a'. Suitable materials for microspheres 32b' are relatively soft so they are compressible and sized so that they will not cause undue levels of optical attenuation if they press against the optical fiber or ribbon. By way of example, suitable hollow microspheres are available from Akzo Nobel of the Netherlands under the tradename EXPANCEL and includes copolymers of monomers vinylidene chloride, acrylonitrile, and methylmethacrylate. Other plastic hollow microspheres are available from Asia Pacific Microspheres of Malaysia under the tradename of PHENOSET, which are phenolic and amino-based Microspheres.

The compressible nature of hollow polymeric microspheres is suited for providing adequate coupling of the optical fibers to the tube or cable jacket. Additionally, the smooth round surface of these microspheres permits pressing against the optical fibers without inducing elevated levels of optical attenuation such as during bending, twisting, or crushing of the cable. Additionally, the size of the hollow microspheres can vary from about 1 micron to about 300 microns, likewise, a wall thickness of the microspheres can also vary from about 0.1 micron up to several microns, but other suitable dimensions are possible as long as a suitable level of optical performance is maintained.

Figure 3B:
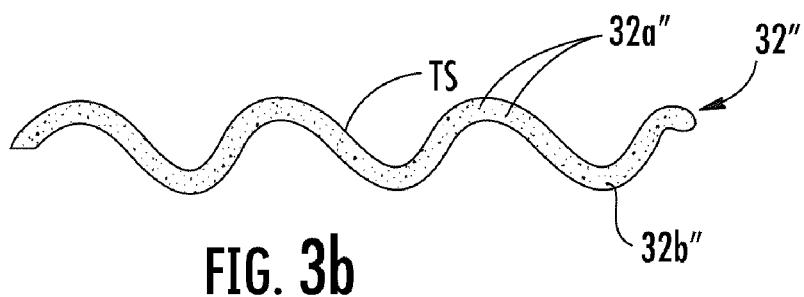

FIG. 3b depicts another example of a dry insert 32" that provides a compressible layer 32b" using geometry of its shape. More specifically, compressible layer 32b" is provided by using a dimensional fabric that has a generally textured shape in one or more directions for providing the compressible layer. As shown, dry insert 32" has a generally textured shape TS and is formed from a suitably soft and flexible material so that it can deform for providing an adequate level of coupling for the optical fibers or ribbons without causing undue levels of optical attenuation. By way of example, suitable fabrics are available from Freudenberg of Durham, N.C. under the name of Novolon. The dimensional fabrics may be formed from a variety of materials such as polyester, polypropylene, nylon, or other suitable materials. Generally speaking, dimensional fabrics are formed using a molding process for transforming a two-dimensional (i.e., flat) fabric or substrate into a three-dimensional (i.e., textured shape) fabric or substrate with the desired textured shape TS. The coupling and/or compressibility of dry insert 32" can be tailored by changing parameters such as the number of contact points per surface area (i.e., changing the density of high and low contact points), the height from a high point to a low point, the dimension fabric profile, and/or flexibility of the dimensional fabric. Again, dry insert 32" can include an optional water-swellable layer for blocking the migration of water along the cable or tube assembly. For instance, the water-swellable layer may be a coating applied to one or more surfaces or applied to the fibers of the dimensional fabric, include water-swellable particles disposed in or on the dry insert, and/or may include superabsorbent fibers. Suitable water-swellable filaments are, for example, LANSEAL materials available from Toyobo of Osaka, Japan or OASIS materials available from Technical Absorbents Ltd. of South Humberside, United Kingdom.

Figure 3C:
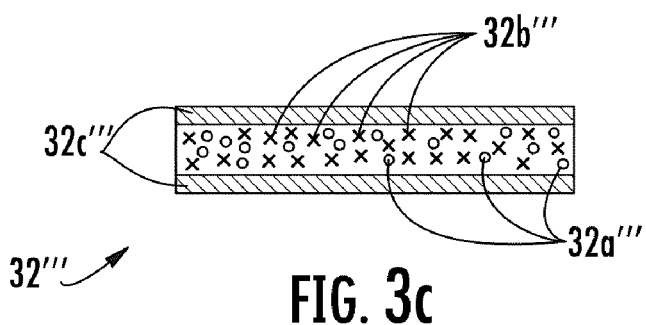

FIG. 3c depicts a further embodiment of a dry insert 32''' having a compressible layer 32b''' having a non-woven layer of felt substance made of one or more materials formed from non-continuous and/or continuous filaments. Dry insert 32''' may optionally include a water-swellable layer and/or one or more tapes for attaching the felt substance thereto. For instance, dry insert 32''' includes a plurality of water-swellable filaments 32a''' along with other filaments 32b''' that are non-swellable disposed between a plurality of optional tapes 32c''', thereby forming dry insert 32''', As used herein, "felt substance" means a material comprising one or more types of non-continuous or continuous filaments and/or fibers which have been caused to adhere and/or matt together through the action of heat, moisture, chemicals, pressure, or mechanical action such as needle-punching or spun-lacing, or a combination of the foregoing actions, thereby forming a relatively thick and compressible layer. Water-swellable filaments 32a''' may comprise any suitable water-swellable material. By way of example, dry insert 32''' of FIG. 3c may include about 25% or less by weight of water-swellable filaments 32a''' and about 75% or more by weight of other filaments 32b'''; however, other suitable ratios are possible. Other filaments 32b''' may include any suitable filament and/or fiber material such as polymer filaments like polypropylene, polyethylene, and polyesters, likewise, other suitable materials such as cottons, nylon, rayons, elastomers, fiberglass, aramids, polymers, rubber-based urethanes, composite materials and/or blends thereof may be included as a portion of other filaments 32b''' and may be tailored for providing specific characteristics.

Figure 3D:
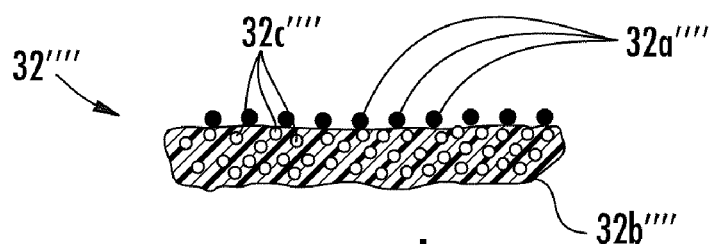

FIG. 3d depicts yet another dry insert 32'''' shaped as a generally flat tape having a compressible layer with a suitable width. By way of example, dry insert 32'''' is made of a plurality of filaments such as a plurality of generally continuous polyester filaments grouped together by a matrix material, but the use of other filament materials is possible. An optional compressible layer is formed by, for instance, foaming the matrix material, thereby providing a compressible layer 32b''''. In other embodiments, the matrix material is not foamed so it doesn't provide a compressible layer, but still provides the desired level of coupling. Additionally, the matrix material is used for attaching a plurality of water-swellable particles to dry insert 32'''' for forming a water-swellable layer 32a''''. Suitable foamed matrix materials include vinyls, polyurethanes, polypropylenes, EVAs, or polyethylene blends. The plurality of filaments and the matrix material are run through a die that forms dry insert 32'''' into its desired shape such as a generally flat ribbon-like profile. Dry inserts 32'''' may be run parallel to the fiber ribbons in a sandwich configuration or have other configurations such as helically wrapped about the optical fibers or ribbon stack. Other similar constructions are possible using any suitable materials for providing the compressible layer and the water-swellable layer. Dry insert can include still other constructions and/or materials such as sponge-like materials for a compressible layer such as polyvinylalcohol (PVA).

No matter the construction and/or materials of the dry insert, filling material or the like, it should provide a suitable level of coupling for the optical fibers to the cable jacket. Additionally, in order to quantify the amount of coupling for the optical fibers a relatively long length of fiber optic cable is required. By way of example, optical fibers of cables according to the present invention have a coupling force of at least about 0.1625 Newtons per optical fiber for a thirty-meter length of fiber optic cable. Illustratively, a fiber optic cable having a single ribbon with twelve optical fibers in the ribbon should have a minimum coupling force of about 1.95 Newtons for a thirty-meter length of fiber optic cable. Likewise, a similar fiber optical cable having a single optical fiber ribbon with six optical fibers should have a minimum coupling force of about 0.975 Newtons for a thirty-meter length of fiber optic cable. Measurement of the coupling force is accomplished by taking a thirty-meter fiber optic cable sample and pulling on a first end of the optical fibers (or fiber optic ribbon(s)) and measuring the force required to cause movement of the second end of the optical fiber(s) (or fiber optic ribbon(s)). In other words, the EFL (or ERL) must be straightened so that the coupling force is the amount of force required to move the entire length of optical fibers within the thirty-meter fiber optic cable sample.

Figure 4:
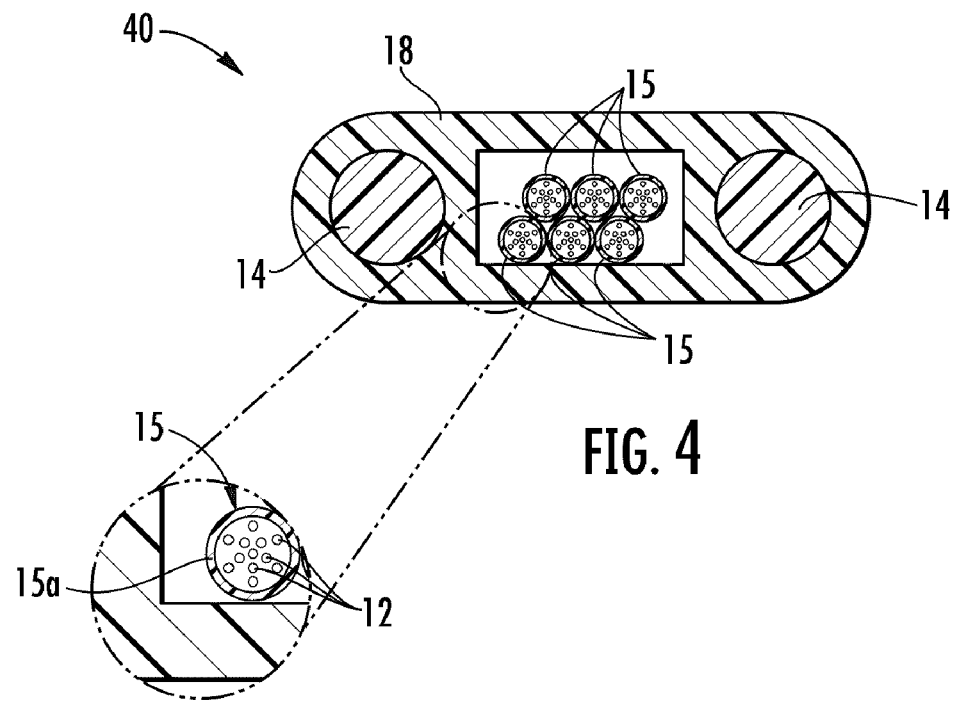
FIG. 4 is a cross-sectional view of yet another explanatory fiber optic cable according to the present invention.

FIG. 4 depicts a cable 40 similar to cable 10 that has a plurality of optical fiber modules 15 instead of ribbons 13. Optical fiber modules 15 organize and protect the plurality of optical fibers 12 within each module jacket 15a. Consequently, optical fiber modules 15 can be routed out of the cavity of cable 40 while still having a protective covering disposed about the optical fibers. By way of example, each optical fiber module 15 includes twelve colored optical fibers 12, thereby forming a relatively high optical fiber packing density. Moreover, optical fiber module 15 allows access to individual optical fibers within the module jacket 15a without having to remove the same from a ribbon matrix material. Preferably, module jacket 15a is formed from a material that is easily tearable without tools. For instance, module jacket 15a is formed from a highly filled material so that it is easily tearable by the craftsman merely using his fingers to tear the same and it will not stick to colored or tight-buffered optical fibers. Suitable module jacket materials may include a polybutylene terephthalate (PBT), a polycarbonate and/or a polyethylene (PE) material and/or an ethylene vinyl acrylate (EVA) or other blends thereof having fillers like a chalk or talc; however, other suitable materials are possible such as a UV-curable acrylate. Modules 15 may include other suitable components such as a grease, water-swellable yarn, suitable thread or tape, a ripcord, or other suitable component. Additionally, the cavity of cable 40 may include a grease, water-swellable yarn or tape, dry insert, and/or any other suitable component.

FIG. 5 depicts a fiber optic cable 50 that is similar to cable 10, but it further includes a tube 52 having a generally rectangular cross-section within the cavity and a toneable lobe 55. Tube 52 provides further protection for optical fibers 12 when opening the cavity. Moreover, since optical fibers 12 remain within a protective structure after the cavity of the cable is opened, i.e., tube 52, module or the like, the optical fibers may be routed and stored while still being protected. By way of example, when the cable is routed into a closure a portion of jacket 18 is removed and strength members 14 are cut to an appropriate length so they can be strain relieved, thereafter tube 52 having optical fibers 12 therein can be routed within the closure while being protected and the protective structure can be removed or opened when required. In this embodiment, tube 52 provides the freespace that allows fiber movement. Additionally, the material for tube 52 may be selected for providing predetermined friction properties for tailoring the coupling level between the optical fibers, ribbons, modules, or the like.

Cable 50 also includes toneable lobe 55 that is useful for locating the cable in buried applications while still allowing for a main cable body 51 that is dielectric. Toneable lobe 55 includes a conductive wire 57 disposed within a jacket portion 58 of toneable lobe 55. By way of example, conductive wire 57 is a 24-gauge copper wire that allows the craftsman to apply a toning signal thereto for locating the cable so it can be located or have its location marked to prevent inadvertent damage. Jacket 18 and jacket portion 58 are typically co-extruded simultaneously using the same extrusion tooling. As shown, jacket portion 58 is connected with jacket 18 of main cable body 51 by a frangible web 59 so that toneable lobe 55 can easily be separated from main cable body 51 for connectorization or other purposes. Specifically, web 59 can include a preferential tear portion (not numbered) using suitable geometry for controlling the location of the tear between the toneable lobe 55 and main cable body 51. Toneable lobe 55 preferably tears away from main cable body 51 cleanly so that it does not leave a ridge thereon, thereby allowing for a profile that permits easy sealing with a connector boot or the like. Toneable lobe 55 is advantageous because if the cable is struck by lightning the toneable lobe 55 would be damaged, but main cable body 51 would not be significantly damaged since it is dielectric. Consequently, the cable is toneable without requiring the labor and hardware necessary for grounding the cable. Of course, other cables of the present invention may also include a toneable lobe.

Figure 6:
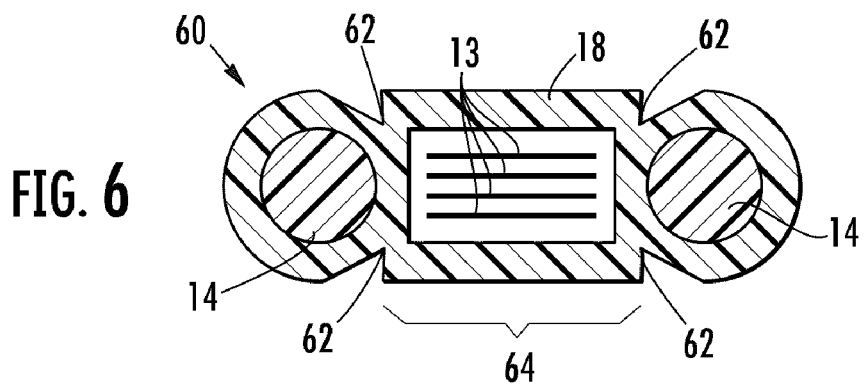
FIG. 6 is a cross-sectional view of an explanatory fiber optic cable having a tearable portion for separating a portion of the cable according to the present invention.

FIG. 6 depicts another cable 60 similar to cable 10 which further includes at least one preferential tear portion 62 for separating one or more of the strength members 14 from a medial portion 64 of cable 60. As depicted, cable 60 includes four preferential tear portions 62 disposed between a respective strength member 14 and medial portion 64. Consequently, each respective strength member 14 along with a portion of jacket 18 may be separated from medial portion 64 of cable 60 by the application of a sufficient separation force. Preferential tear portions 62 are advantageous because they allow optical fibers 12 to have a protective structure without using a module or tube. In other words, the portion of jacket 18 that remains after separating strength members 14 from medial portion 64 acts as a protective structure for the optical fibers. Additionally, cable 60 includes more than two optical fiber ribbons 13, thereby yielding a relatively high fiber count for distribution.

Figure 7:
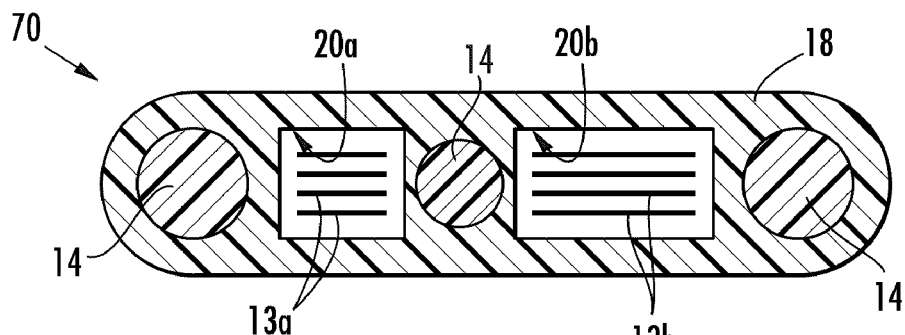
FIGS. 7 and 7A are cross-sectional views of explanatory fiber optic cables having a plurality of cavities according to the present invention.
Figure 7A:
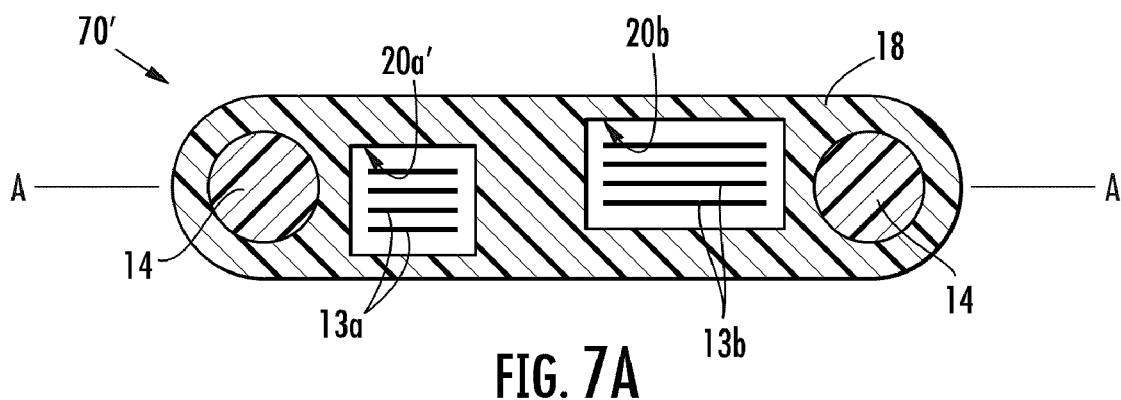

FIG. 7 depicts still another cable 70 according to the present invention that includes a plurality of cavities 20a,20b for housing optical fibers. Using more than one cavity allows for flexibility in the cable applications. Multiple cavities can have similar or different sizes that are suited for the particular application. As shown, cavities 20a,20b have similar minor dimensions, but have different major dimensions, thereby allowing different ribbon fiber counts in respective cavities. Specifically, cavity 20a is sized for a plurality of 4-fiber ribbons 13a that can be accessed for distribution along the cable and then routed toward the subscriber and cavity 20b is sized for a plurality of 12-fiber ribbons 13b that are intended to run the entire length of the cable. Other embodiments are possible, for instance, a first cavity can have modules with 4-fibers and a second cavity can have modules with 12-fibers. FIG. 7 also illustrates an optional strength member 14 disposed between cavities 20a and 20b. The optional strength member is advantageous if it desired to only access one of the cavities when opening the cable by allowing a stopping point and/or a guide for the cutting tool. The optional strength member may be the same size as the outboard strength members or it may have a different size. Moreover, the optional strength member may have a shape other than round so that the major cable dimension may be minimized. Other structures may be used for aiding in opening only one of multiple cavities. For instance, FIG. 7a depicts a cable 70' having cavities 20a' and 20b' that are offset relative to plane A-A that passes through the center points of strength members 14. Specifically, cavity 20a' is offset towards the bottom major surface of the cable for access from that surface and cavity 20b' is offset towards the top major surface of the cable for access from that surface. Simply stated, the cavity having the four fiber ribbons is easily accessible from one major surface and the cavity having the twelve fiber ribbons is easily accessible from the other major surface. Moreover, one or more of the major surfaces may be marked (not visible) to indicate which cavity is accessible from the given surface. Of course, other cables configurations of the present invention can use more than one cavity.

Figure 8:
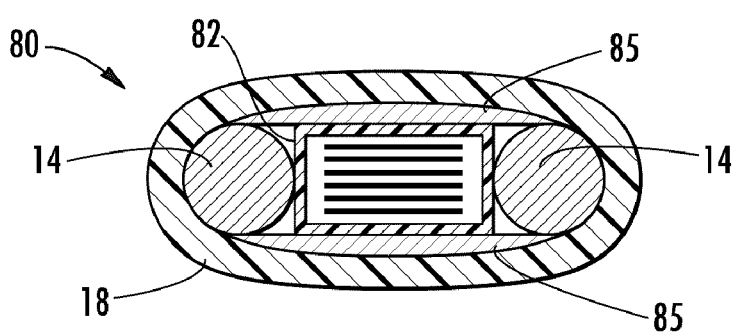
FIGS. 8 and 8A are cross-sectional views of explanatory fiber optic cables having an armored component according to the present invention.
Figure 8A:
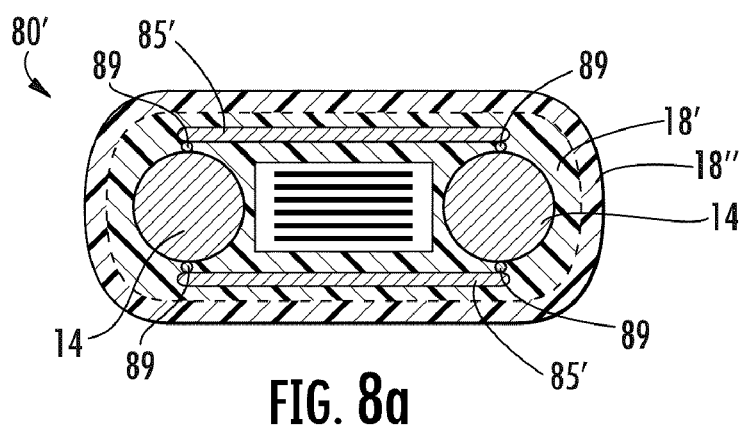

FIG. 8 illustrates a fiber optic cable 80 that includes at least one armored component 85 that provides rodent protection and/or additional crush strength for the cable. Specifically, cable 80 includes at least one optical fiber 12 disposed within a tube 82 that has strength members 14 disposed on opposite ends thereof, two armor components 85 are disposed about tube 82, and jacket 18 is applied thereover. Armor components 85 may be formed from any suitable material such as a dielectric such as a high-strength polymer or a conductive material such as a steel tape. Moreover, the armor components may be, shaped, ribbed, corrugated or the like for improving its crush strength and/or flexural performance of the cable. In this embodiment, armor components 85 have respective curved end portions that generally contact each strength member 14 so that any crush forces are directed and/or transferred towards the same. Additionally, if a conductive armor component is used, strength members 14 are preferably also formed from a conductive material such as steel, rather than a more expensive glass-reinforced plastic strength member. Moreover, it is also possible to join or attach strength member 14 with the armor layer by gluing, crimping, welding, or the like. FIG. 8a depicts a cable 80' having a pair of generally flat armor components 85 disposed within the cable jacket. The cable jacket of this embodiment is formed from more than one layer, specifically an inner jacket 18' and an outer jacket 18". Consequently, the properties may be tailored for performance such as coupling, tear resistance, or the other properties. By way of example, inner jacket 18' may be a linear low-density polyethylene (LLDPE) for tear resistance and outer jacket 18" may be a medium or high density polyethylene for durability and abrasion resistance; however, other suitable materials may be used. In this embodiment, the cavity does not include a tube therein and the minor cavity dimension is smaller than the strength member dimension. Additionally, cable 80' includes a plurality of optional ripcords 89 disposed between armor components 85' and strength members 14.

Cables of the present invention are also useful as a portion of a larger cable assembly that is useful for distributing optical fibers toward the subscriber. The cable assemblies can be assembled in the factory or they can be constructed in the field. FIGS. 9 and 10 respectively depict perspective and cross-sectional views of an exemplary cable assembly 100 that is suitable for distributing optical fiber(s) towards the subscriber in a communication network. Cable assembly 100 includes a distribution cable 110, which may be similar to cable 10, and a tether cable 130 that can be used for connecting to a node of the optical network. In preferred embodiments, a plurality of tether cables 130 have at least one optical fiber in optical communication with optical fibers of distribution cable 110 so that the cable assembly can connect to a plurality of nodes. Cable assemblies of the present invention can use any suitable distribution and/or tether cables as dictated by the given application. As shown, distribution cable 110 includes at least one optical fiber that is a portion of optical fiber ribbon 113, at least one strength member 114, and a cable jacket 118. Cable jacket 118 forms a cavity 120 therein for housing optical fiber 112. Like cable 10, cavity 120 has a cavity minor dimension CH and a cavity major dimension CW. Again, cavity minor dimension CH is generally aligned with a minor dimension H1 of distribution cable 110 and cavity major dimension CW is generally aligned with the major dimension W1 of distribution cable 110. As depicted, distribution cable 110 strength members 114 are disposed on opposite sides of cavity 120 and are sized so that a strength member dimension D is about the same size or smaller than the cavity minor dimension CH, but other suitable geometries are possible. Consequently, the craftsman in the factory or the field has simple and easy access to cavity 120, thereby allowing entry to cavity 120 while inhibiting damage to the at least one optical fiber 112 and/or strength members 114 during the access procedure.

FIG. 10a is a perspective view showing distribution cable 110 after it is opened with tether cable 130 prepared and in position before being wrapped by a tape (not shown) and encapsulated by a sealing portion 140 such as overmolded portion, heat-shrink tubing or the like. As shown, the appropriate optical fibers of tether cable 130 are optically connected with the appropriate optical fibers of distribution cable 110 and the routing of fibers and the optical connection are protected from undue stresses using suitable structures and/or components during bending. Preparing tether cable 130 for assembly 100 optionally includes removing a portion of the jacket 138 of tether cable 130 and optionally exposing the strength members 134 and as shown. A portion of strength members 134 are exposed so that they can be connected and/or secured by the sealing portion 140, thereby providing strain relief for tether cable 130. Thereafter, the optical fibers (not numbered) of tether cable 130 may be enclosed in a respective furcation tubing (not numbered) for protecting and routing the fibers towards a splice point 125. The optical fibers are fusion spliced together and splice point 125 may be optionally held in a splice holder, furcation tube, or the like and may generally disposed within an opened portion of the cavity 120 of the distribution cable. Positioning splice point 125 within cavity 120 is advantageous because it is disposed relatively close to a neutral bending axis of cable assembly 100, thereby inhibiting stresses on splice point 125 during bending of cable assembly 100. Additionally, the splice holder and a portion of the furcation tubes may optionally be enclosed within a small tube for further protection and/or allowing small movement among the components. Of course, other constructions are possible such as locating the splice outward of the distribution cable and using an indexing tube with the tether cable for preloading an excess fiber length into the tether optical fiber. Then, about the point where the optical connection between the cables is performed an environmental seal is provided to seal out the elements and inhibit bending beyond a minimum bend radius. By way of example, the area about the connection point of the cables includes sealing portion 140 formed from a suitable material, but other suitable sealing configurations are possible. Before applying a sealing portion 140 such as overmolding or heat shrink tubing, an optional protective tape or wrap is applied over the splice area for keeping the overmold material away from sensitive areas. The cross-sectional footprint of sealing portion 140 should be relatively small and straightforward to construct while providing the necessary protection. Additionally, tether cable 110 may further include a ferrule 139 and/or a connector (not shown) on its free-end for quick and easy connection to the optical network. In assemblies intended for outdoor applications the connector is preferably environmentally sealed and hardened, thereby making it robust and reliable. An example of a suitable connector is available from Corning Cable Systems sold under the tradename OptiTap; however, other suitable connectors may be used.

Figure 11A:
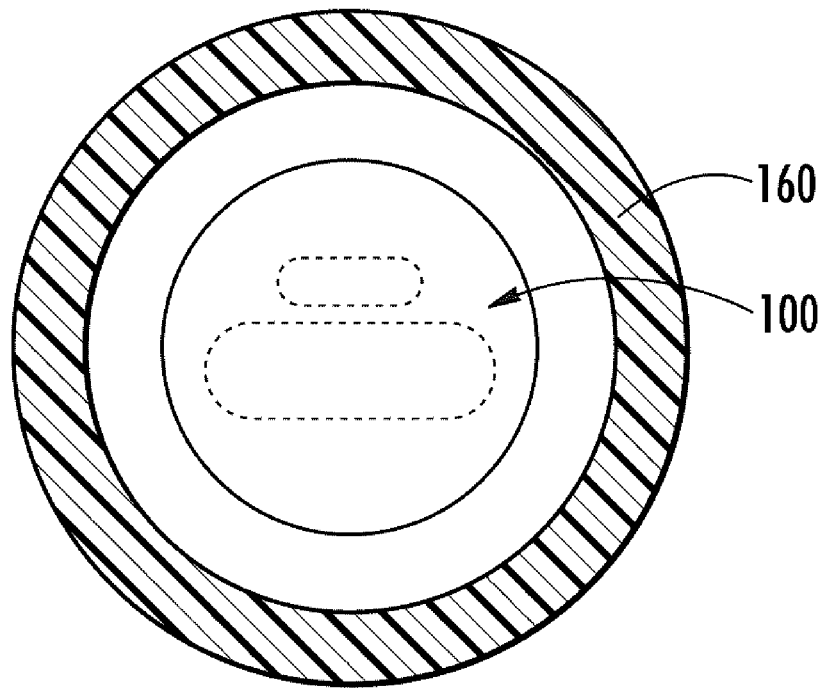
FIGS. 11a and 11b respectively depict schematic cross-sectional views of the fiber optic cable assembly of FIGS. 9 and 10 disposed within a duct and a schematic cross-sectional view of a fiber optic assembly using a round cable.
Figure 11B:
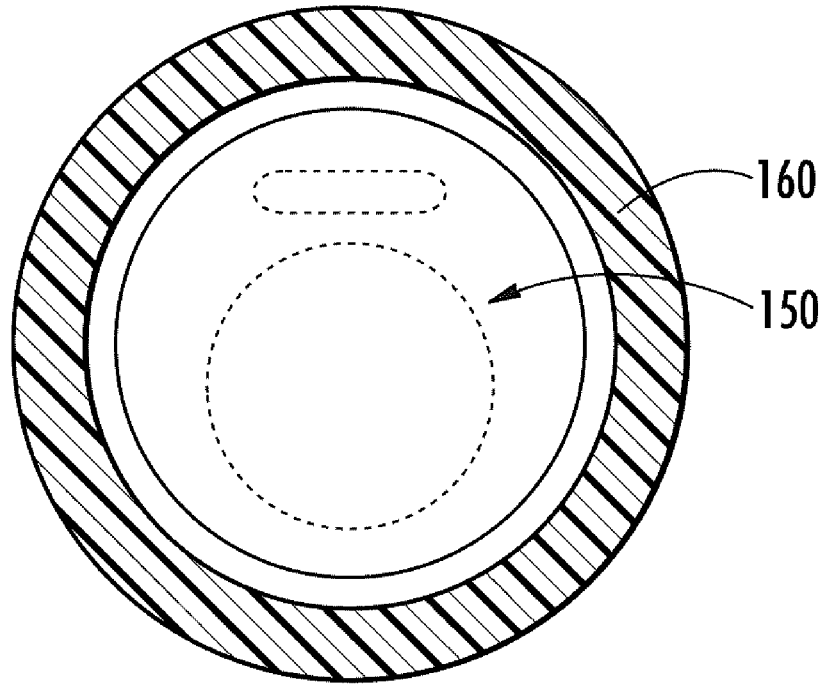

Tether cable 120 can have any suitable cable construction such as round or generally flat as shown in FIG. 9; however, a generally flat design may have advantages. Because cable assembly 100 uses two generally flat cables it imparts a relatively small cable assembly cross-sectional footprint with adequate flexibility, thereby making the assembly advantageous in certain applications such as pulling into ducts where small footprints and flexibility are required. For instance, small suitable cross-section footprints such as in FIG. 9 makes pulling the cable assembly into ducts such as 1¼ inch inner diameter ducts relatively easy. Respectively, FIGS. 11a and 11b schematically depict a cross-section of cable assembly 100 disposed in a 1¼ inch inner diameter duct and a cross-section of a cable assembly 150 using a round distribution cable for comparative purposes. As shown, cable assembly 100 has a relatively small duct fill ratio that allows for easily pulling of the assembly. Besides the fill ratio, the maximum assembly cross-sectional dimension is also important when pulling into duct. As shown by FIG. 11, cable assembly 100 has a relatively small maximum assembly cross-sectional dimension because the major dimensions of the cables are generally parallel and the minor dimensions are generally stacked together. Consequently, cable assembly 100 is suitable for aerial, buried, or duct applications. On the other hand, cable assembly 150 uses a round distribution cable and has a relatively large fill ratio and maximum assembly cross-sectional dimension, thereby making pulling around bends and corners in duct difficult if not impossible if the assembly fits within the duct.

Cable assembly 100 has a maximum cross-sectional area near the point where tether cable 130 is connected due to the connectorization and/or environmentally sealing, (i.e., the overmolding), near the point where the distribution cable is opened. For instance, at the sealing portion 140, cable assembly 100 preferably has a maximum assembly cross-sectional dimension of about 25 millimeters or less, more preferably, about 21 millimeters or less, and most preferably about 17 millimeters or less. Additionally, cable assemblies of present invention have a fill-ratio about 80 percent or less and more preferably about 70 percent or less for the given inner diameter of the duct.

FIGS. 12 and 12a respectively illustrate a cross-sectional view and a perspective view of a cable assembly 200 that includes a distribution cable 210, a receptacle or other suitable joining point 230, and a sealing portion 240 such as an overmold portion or the like. Cable assembly 200 is advantageous because it has a relatively small cross-sectional footprint due to the arrangement between distribution cable 210 and receptacle 230. Distribution cable 210 includes a plurality of ribbons 213 disposed within a cavity 220 of a cable jacket 218. Distribution cable 210 also includes two strength members 214 disposed on opposite sides of cavity 220. Distribution cable 210 has a flat profile with two generally flat major surfaces (not numbered) with major dimension W2 and minor dimension H2 of the cable; however, this cable may have any suitably sized and/or shaped cavity. Simply stated, cavity 220 may have any suitable minor or major dimension. In this embodiment, cable assembly 200 routes the optical fibers from one or more of the plurality of ribbons 213 of distribution cable 210 to receptacle 230 without using a tether cable. As shown, this embodiment includes twelve-fiber ribbons and uses twelve-fiber ferrules; however, any suitable combination of optical fiber arrangements and ferrule constructions are possible. Receptacle 230 is suitable for terminating a plurality of optical fibers 212 within a multifiber ferrule 232 that is attached to housing 234 of the receptacle. Receptacle 230 is preferably hardened and configured for an environmental sealing of the assembly. Housing 234 aids in aligning and protecting ferrule 232 and is preferably keyed. Additionally, receptacle 230 may have a threaded portion for securing the optical connection with a complimentary mating assembly such as a hardened connector. Additionally, receptacle 230 can have a cap 250 that is removably attached thereto for protecting the ferrule, connector, and/or receptacle during sealing such as with overmolding and afterwards. Suitable receptacles are shown and described in U.S. Pat. No. 6,579,014 issued Jun. 17, 2003 entitled "Fiber Optic Receptacle" and U.S. patent application No. 10/924,525 filed Aug. 24, 2004 entitled "Fiber Optic Receptacle and Plug Assemblies". Other cable assemblies may have connectors or receptacles that eliminate the shroud or housing, thereby allowing a smaller cross-sectional footprint. Specifically, optical fibers 212 are routed to a multifiber ferrule 232 of connector 230 where they are attached in respective bores. Ferrule 232 has a cross-section with a minor axis FH and a major axis FW. Ferrule 232 may have any suitable orientation with respect to cable 210, but in preferred embodiments minor axis FH is generally aligned with minor dimension H2 of cable 210, thereby providing a known orientation that may be useful for maintaining a small cross-sectional footprint for the assembly. Of course, cable assembly 200 can have multiple connectors 230 attached along its length; moreover, cable assembly 200 may locate connectors on either or both sides of the generally flat major surfaces.

Figure 14:
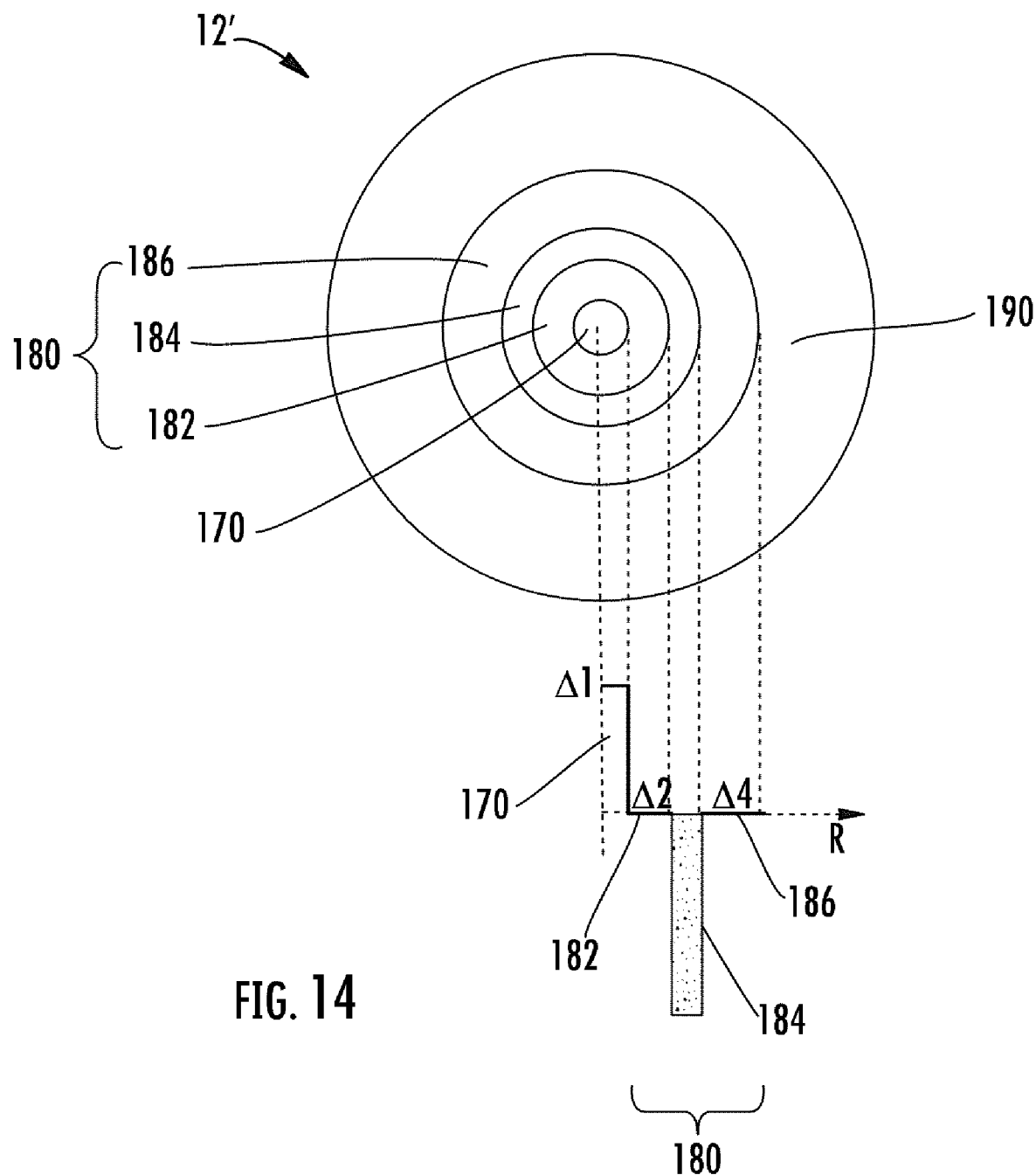
FIG. 14 is a schematic diagram illustrating a cross-section of a bend performance optical fiber in accordance with an exemplary embodiment of the present invention.

The cables of the present invention may also use optical fibers that are relatively bend resistant for preserving optical performance when subjected to relatively small bend radii. FIG. 14 depicts a representation of a bend performance optical fiber 12' suitable for use in fiber optic cables, cables assemblies, fiber optic hardware and other network components of the present invention. For instance, cable 30 using a bend performance optical fiber has relatively small delta attenuation when coiled into a relatively small bend radius. By way of example, when bent into a coil having a single turn with a diameter of about 200 millimeters (i.e., a radius of about 100 millimeters) optical fibers of cable 30 have a delta optical attenuation of about 0.1 dB or less per turn, and more preferably about 0.03 dB or less per turn, thereby preserving suitable levels of optical performance for the cable. For instance, slack storage of several turns such as 3 or more turns of cable 30 into a coil having a diameter of about 200 millimeters would result in the delta optical attenuation of about 0.4 dB or less.

By way of example, bend resistant optical fibers may have microstructures that allow reduced bend radii while preserving optical performance, thereby permitting aggressive bending/installation solutions while optical attenuation remains extremely low. As shown, bend performance optical fiber 12' is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments, the microstructured optical fibers disclosed herein comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", we mean that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. As illustrated in FIG. 14, in some embodiments, the core region 170 comprises a single core segment having a positive maximum refractive index relative to pure silica $\Delta_1$ in %, and the single core segment extends from the centerline to a radius $R_1$. In one set of embodiments, 0.30%<$\Delta_1$<0.40%, and 3.0 µm<$R_1$<5.0 µm. In some embodiments, the single core segment has a refractive index profile with an alpha shape, where alpha is 6 or more, and in some embodiments alpha is 8 or more. In some embodiments, the inner annular hole-free region 182 extends from the core region to a radius $R_2$, wherein the inner annular hole-free region has a radial width W12, equal to R2−R1, and W12 is greater than 1 µm. Radius R2 is preferably greater than 5 µm, more preferably greater than 6 µm. The intermediate annular hole-containing region 184 extends radially outward from R2 to radius R3 and has a radial width W23, equal to R3−R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region 170 and the cladding region 180 are preferably comprised of silica. The core region 170 is preferably silica doped with one or more dopants. Preferably, the core region 170 is hole-free. The hole-containing region 184 has an inner radius R2 which is not more than 20 µm. In some embodiments, R2 is not less than 10 µm and not greater than 20 µm. In other embodiments, R2 is not less than 10 µm and not greater than 18 µm. In other embodiments, R2 is not less than 10 µm and not greater than 14 µm. Again, while not being limited to any particular width, the hole-containing region 184 has a radial width W23 which is not less than 0.5 µm. In some embodiments, W23 is not less than 0.5 pm and not greater than 20 µm. In other embodiments, W23 is not less than 2 µm and not greater than 12 µm. In other embodiments, W23 is not less than 2 µm and not greater than 10 µm.

Such fiber can be made to exhibit a fiber cutoff of less than 1400 nm, more preferably less than 1310 nm, a 20 mm macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and a 8 mm macrobend induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

Figure 15:
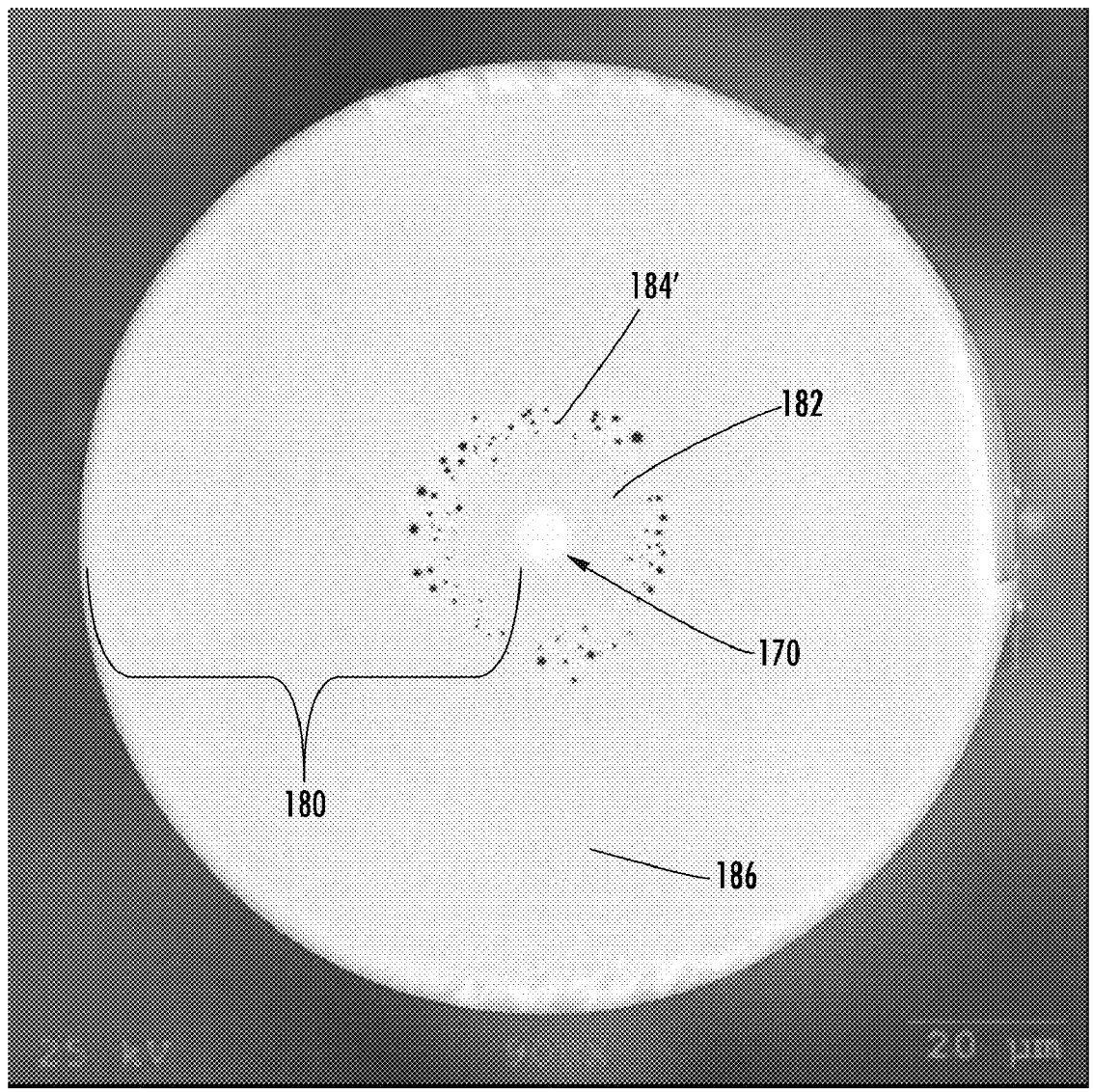
FIG. 15 is a cross-sectional image of a microstructured bend performance optical fiber illustrating an annular hole-containing region comprised of non-periodically disposed holes.

An example of a suitable fiber is illustrated in FIG. 15. The fiber in FIG. 15 comprises a core region that is surrounded by a cladding region that comprises randomly disposed voids which are contained within an annular region spaced from the core and positioned to be effective to guide light along the core region. Other optical types of bend performance optical fibers and/or microstructured fibers may be used in the present invention. Additional description of microstructured fibers used in the present invention are disclosed in pending U.S. patent application Ser. No. 11/583,098 filed Oct. 18, 2006; and, Provisional U.S. patent application Ser. Nos.

60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated; and incorporated herein by reference.

It will be apparent to those skilled in the art that various modifications and variations can be made in the cable and cable assemblies of the present invention without departing from the spirit or scope of the invention. For instance, cables or assemblies of the present invention can include other cable components such as ripcords, paper or mica tapes, a friction element, or other suitable components. Illustratively, a cable similar to cable 10 can further include a plurality of small steel wires disposed near the north and south positions for inhibiting cutting into the grps during access procedures. Although cable assemblies discuss a distribution cable that is in optical communication with one or more tether cables, the cable assemblies may be used upstream in the optical network such as a feeder cable that is in optical communication with one or more distribution cables. Thus, it is intended that the present invention cover the modifications and variations of this invention provided they come within the scope of the appended claims and their equivalents.

That which is claimed is:

1. A fiber optic cable assembly comprising:
   a dry distribution cable having:
   (a) at least one optical fiber;
   (b) at least one strength member; and
   (c) a cable jacket, the cable jacket having a cavity, wherein the at least one optical fiber is disposed within the cavity, and the at least one optical fiber having a predetermined level of coupling to the cable jacket, wherein the predetermined level of coupling is about 0.1625 Newtons or more per optical fiber for a thirty meter length of the dry distribution cable; and
   a tether optical fiber cable, the tether optical fiber cable having at least one tether optical fiber, the at least one tether optical fiber being in optical communication with the at least one optical fiber of the dry distribution cable.

2. The fiber optic cable assembly of claim 1, further comprising a sealing portion that provides an environmental seal between the dry distribution cable and the tether cable.

3. The fiber optic cable assembly of claim 2, further comprising a ferrule attached to the at least one tether optical fiber.

4. The fiber optic cable assembly of claim 1, further comprising a ferrule attached to the at least one tether optical fiber.

5. The fiber optic cable assembly of claim 1, further comprising a multifiber ferrule attached to the at least one tether optical fiber, the multifiber ferrule comprising a portion of a connector.

6. The fiber optic cable assembly of claim 1, further comprising a ferrule attached to the at least one tether optical fiber, wherein the ferrule is a portion of a connector that includes a shroud.

7. The fiber optic cable assembly of claim 1, further comprising a multifiber ferrule attached to the at least one tether optical fiber.

8. The fiber optic cable assembly of claim 7, wherein the cavity is generally rectangular.

9. The fiber optic cable assembly of claim 1, wherein the cavity is generally rectangular.

10. The fiber optic cable assembly of claim 1, further comprising at least two strength members that are disposed on opposite sides of the cavity of the dry distribution cable.

11. The fiber optic cable assembly of claim 10, wherein the cavity is generally rectangular.

12. The fiber optic cable assembly of claim 1, the at least one optical fiber being a portion of a fiber optic ribbon.

13. The fiber optic cable assembly of claim 12, wherein the cavity is generally rectangular.

14. The fiber optic cable assembly of claim 12, wherein the fiber optic ribbon is splitable into subunits.

15. The fiber optic cable assembly of claim 1, the at least one optical fiber of the dry distribution cable being a portion of a module, the module having a sheath.

16. The fiber optic cable assembly of claim 15, further comprising a water-swellable component or a water-blocking component.

17. The fiber optic cable assembly of claim 1, further comprising a water-swellable component or a water-blocking component.

18. The fiber optic cable assembly of claim 1, further comprising a tube disposed within the cavity.

19. The fiber optic cable assembly of claim 1, further including at least one dry insert disposed within the cavity for coupling the at least one optical fiber with the cable jacket.

20. The fiber optic cable assembly of claim 19, wherein the cavity is generally rectangular.

21. The fiber optic cable assembly of claim 1, the cavity being offset from an plane A-A so that it is closer to one of the two major surfaces than the other major surface, wherein plane A-A is defined by the center points of a pair of strength members that are disposed on opposite side of the cavity.

22. The fiber optic cable assembly of claim 21, wherein the cavity is generally rectangular.

* * * * *